United States Patent
Wang et al.

(10) Patent No.: US 12,440,483 B2
(45) Date of Patent: Oct. 14, 2025

(54) PHARMACEUTICAL COMPOSITION CONTAINING ILAPRAZOLE OR SALT THEREOF AND PREPARATION METHOD THEREFOR

(71) Applicant: LIVZON PHARMACEUTICAL GROUP CO., LTD, Zhuhai (CN)

(72) Inventors: Tao Wang, Zhuhai (CN); Xuemei Hou, Zhuhai (CN); Caihua Cheng, Zhuhai (CN); Wenqi Lu, Zhuhai (CN); Xiangsheng Kong, Zhuhai (CN); Xiangna Zhang, Zhuhai (CN); Zengqing Tu, Zhuhai (CN); Yurong Zhang, Zhuhai (CN); Xiaohong Wu, Zhuhai (CN); Jing Li, Zhuhai (CN); Hongdan Chen, Zhuhai (CN); Jialu Chen, Zhuhai (CN)

(73) Assignee: LIVZON PHARMACEUTICAL GROUP CO., LTD, Zhuhai (CN)

( * ) Notice: Subject to any disclaimer, the term of this patent is extended or adjusted under 35 U.S.C. 154(b) by 1332 days.

(21) Appl. No.: 17/254,830

(22) PCT Filed: Oct. 24, 2018

(86) PCT No.: PCT/CN2018/111611
§ 371 (c)(1),
(2) Date: Dec. 21, 2020

(87) PCT Pub. No.: WO2019/242181
PCT Pub. Date: Dec. 26, 2019

(65) Prior Publication Data
US 2021/0260046 A1    Aug. 26, 2021

(30) Foreign Application Priority Data
Jun. 22, 2018    (CN) .................. 201810652046.X

(51) Int. Cl.
| | |
|---|---|
| A61K 31/4439 | (2006.01) |
| A61K 9/00 | (2006.01) |
| A61K 9/16 | (2006.01) |
| A61K 9/19 | (2006.01) |
| A61K 47/02 | (2006.01) |
| A61K 47/26 | (2006.01) |
| A61K 47/55 | (2017.01) |
| A61P 1/04 | (2006.01) |

(52) U.S. Cl.
CPC ........ *A61K 31/4439* (2013.01); *A61K 9/0019* (2013.01); *A61K 9/1617* (2013.01); *A61K 9/1623* (2013.01); *A61K 9/1694* (2013.01); *A61K 9/19* (2013.01); *A61K 47/55* (2017.08); *A61P 1/04* (2018.01)

(58) Field of Classification Search
CPC .............. A61K 31/4439; A61K 9/0019; A61K 9/1617; A61K 9/1623; A61K 9/1694; A61K 9/19; A61K 47/55; A61K 47/02; A61K 47/183; A61K 47/26; A61P 1/04
See application file for complete search history.

(56) References Cited

U.S. PATENT DOCUMENTS

2021/0260046 A1    8/2021    Wang et al.

FOREIGN PATENT DOCUMENTS

| CN | 1184970 | C | 1/2005 |
|---|---|---|---|
| CN | 1225240 | C | 11/2005 |
| CN | 102038648 | B | 7/2012 |
| CN | 102769777 | * | 4/2016 |
| CN | 105769777 | A | 7/2016 |
| CN | 105769778 | A | 7/2016 |
| CN | 108685918 | A | 10/2018 |

OTHER PUBLICATIONS

CN102769777—machine-translation, 2024, machine translation of CN102769777.*
Khimani et al., Journal of Chemical and Pharmaceutical Research, 2018, 10(6), 177-183.*
International Search Report, with English Translation, for corresponding International Patent Application No. PCT/CN2018/111611 (6 pages).

* cited by examiner

*Primary Examiner* — Sun Jae Yoo
(74) *Attorney, Agent, or Firm* — Lewis Roca Rothgerber Christie LLP

(57) ABSTRACT

The present invention relates to a pharmaceutical composition containing ilaprazole or a salt thereof, and a preparation method therefor. The pharmaceutical composition contains or consists of ilaprazole or a salt thereof, and a ilaprazole derivative, wherein the amount of the ilaprazole derivative in the pharmaceutical composition is not higher than 1.3 wt % (less than or equal to 1.3 wt %). The composition can be used for treating peptic ulcer bleeding and stress ulcer and preventing upper gastrointestinal hemorrhage caused by severe diseases.

19 Claims, No Drawings

PHARMACEUTICAL COMPOSITION CONTAINING ILAPRAZOLE OR SALT THEREOF AND PREPARATION METHOD THEREFOR

CROSS-REFERENCE TO RELATED APPLICATION

This application is a U.S. National Phase Patent Application of PCT/CN2018/111611, filed Oct. 24, 2018, which claims priority to Chinese patent application CN201810652046.X, filed on Jun. 22, 2018, the entire content of each of which is hereby incorporated by reference in its entirety.

TECHNICAL FIELD

The present invention relates to the technical field of medicine, in particular to a pharmaceutical composition comprising ilaprazole or a salt thereof and preparation method therefor.

BACKGROUND OF THE INVENTION

The chemical name of ilaprazole sodium is 5-(1hydro-pyrrol-1-yl)-2-[[(4-methoxy-3-methyl)-2-pyridyl]-methyl]-sulfinyl-1hydro-benzimidazole sodium salt ilaprazole. Ilaprazole is the latest generation of proton pump inhibitor (PPI) developed and marketed by Livzon Group. It is widely used in digestive tract diseases related to various acids, such as duodenal ulcer, gastric ulcer, reflux esophagitis and the like. Compared with other PPIs, ilaprazole has advantages of strongest antacid activity, no individual differences in treatment, and stronger ability to control acid at night, etc., and is expected to become the core product in the PPI market.

Chinese patent publications CN1184970C and CN1225240C disclose ilaprazoleoral tablets and microparticle formulations of ilaprazole, respectively. However, oral administration of such enteric-coated tablets and enteric-coated microparticles is only suitable for the treatment of peptic ulcer due to benign ulcerative damage to stomach and duodenal mucosa effected by gastric acid and pepsin.

Both CN102038648B and CN105769778A disclose ilaprazole sodium powder for injection and preparation method therefor. That ilaprazole sodium powder for injection is aimed at the administration in severe patients who cannot take oral medicines, for example, patients with peptic ulcer bleeding, acute gastric mucosal lesion bleeding occurred in case of reactive ulcer, acute gastric mucosal damage such as multiple trauma and other serious stress reactions, as well as aimed at the prevention of severe diseases (such as cerebral hemorrhage, severe trauma, etc.) and upper gastrointestinal bleeding caused by gastric surgery and the like.

However, there is currently no further research work on how to more effectively control acute gastric mucosal lesion bleeding, acute gastric mucosal damage such as multiple trauma and other severe stress reactions, and on formulations of ilaprazole powder for injection having more reliable quality.

SUMMARY OF THE INVENTION

The object of the present invention is to provide a pharmaceutical composition comprising ilaprazole or a salt thereof with few adverse reactions and stable properties which meets clinical requirements, and a preparation method therefor.

The above object of the present invention is achieved by the following technical solutions.

In one aspect, the present invention provides a pharmaceutical composition comprising ilaprazole or a salt thereof and an ilaprazole derivative, wherein the amount of the ilaprazole derivative in the composition is no more than 1.3 wt % (≤1.3 wt %).

Preferably, the amount of the ilaprazole derivative in the composition is no more than 1.2 wt %, preferably no more than 1.1 wt %, more preferably no more than 1.0 wt %, further preferably no more than 0.9 wt %, most preferably no more than 0.8 wt %, and for example, the amount of the ilaprazole derivative in the composition is no more than 0.7 wt %, no more than 0.6 wt %, no more than 0.5 wt %, no more than 0.4 wt %, no more than 0.3 wt %, or no more than 0.2 wt %.

Preferably, the salt of ilaprazole is ilaprazole sodium.

Preferably, the purity of the ilaprazole or a salt thereof is no less than 99.9%.

Preferably, the ilaprazole derivative is selected from one or more of ilaprazole sulfone, ilaprazole thioether, and ilaprazole ylide.

Preferably, the ilaprazole ylide is selected from one or more of ilaprazole carboxyl ylide, ilaprazole hydroxyl ylide and ilaprazole mercaptomethyl ylide.

Preferably, the amount of the ilaprazole ylide in the composition is no more than 0.9 wt %, preferably no more than 0.8 wt %, more preferably no more than 0.7 wt %, further preferably no more than 0.6 wt %, most preferably no more than 0.5 wt %, such as no more than 0.4 wt %, no more than 0.3 wt %, or no more than 0.2 wt %.

Preferably, the ilaprazole derivative is ilaprazole sulfone, ilaprazole thioether, ilaprazole carboxyl ylide, ilaprazole hydroxyl ylide and ilaprazole mercaptomethyl ylide. Preferably, the amount of the ilaprazole carboxyl ylide in the composition is no more than 0.3 wt %.

Preferably, the mass ratio of the ilaprazole sulfone to the ilaprazole thioether is 1:0.5-2, preferably 1:0.5-1 or 1:1-2, more preferably 1:1.

In a preferred technical solution, the pharmaceutical composition comprises the following parts by weight of substances:

ilaprazole sodium 98.7-99.5 parts;
ilaprazole sulfone 0.1-0.2 parts;
ilaprazole thioether 0.1-0.2 parts;
ilaprazole carboxyl ylide 0.1-0.3 parts;
ilaprazole hydroxyl ylide 0.1-0.3 parts;
ilaprazole mercaptomethyl ylide 0.1-0.3 parts.

In a more preferred technical solution, the pharmaceutical composition comprises the following parts by weight of substances:

ilaprazole sodium 98.7 parts;
ilaprazole sulfone 0.2 parts;
ilaprazole thioether 0.2 parts;
ilaprazole carboxyl ylide 0.3 parts;
ilaprazole hydroxyl ylide 0.3 parts;
ilaprazole mercaptomethyl ylide 0.3 parts.

In another aspect, the present invention also provides a powder for injection comprising the pharmaceutical composition as described above and a pharmaceutically acceptable carrier.

Preferably, the pharmaceutically acceptable carrier is mannitol and EDTA-2Na.

Preferably, the weight ratio of mannitol to EDTA-2Na is 10-50:1, preferably 30:1.

Preferably, the weight ratio between the weight of the ilaprazole or a salt thereof and the ilaprazole derivative (ie, the pharmaceutical composition as described above) in total, mannitol, and EDTA-2Na in the powder for injection is 1:3-5:0.1-0.3, preferably 1:3:0.1.

Preferably, the pH of the powder for injection is 10.5-11.5, preferably 11.

In a further aspect, the present invention also provides a method for preparing the powder for injection as described above, comprising the following steps:
(1) weighing the ilaprazole or a salt thereof, the ilaprazole derivative, and the pharmaceutically acceptable carrier according to their prescribed amounts;
(2) dissolving the pharmaceutically acceptable carrier in water for injection, and adjusting the pH of the solution obtained to 10.5-11.5, preferably 10.5 with 2 mol/L sodium hydroxide solution, then adding the prescribed amounts of the ilaprazole or a salt thereof and the ilaprazole derivative to the solution, and after the ilaprazole or a salt thereof and the ilaprazole derivative fully dissolve, adjusting the pH of the solution obtained to 10.5-11.5, preferably 11 with 2 mol/L sodium hydroxide solution, and finally adding water for injection of 4° C. to the solution up to 15000 mg;
(3) sterilizing the solution obtained in step (2) through filtering two times with a filter membrane having a pore size of 0.2 μm and freeze-drying the filtrate obtained to obtain freeze-dried powders for injection, which are then sealed with a stopper in a vacuum pump, removed from the vacuum pump and capped with an aluminum cap.

The present invention also provides other technical solutions to achieve the object of the present invention. Specifically, the present invention provides another pharmaceutical composition comprising ilaprazole sodium and an ilaprazole derivative, wherein the ilaprazole derivative is ilaprazole polysulfide dimer, and/or is selected from one or more of ilaprazole sulfone, ilaprazole thioether and ilaprazole ylide.

Preferably, the amount of the ilaprazole derivative is no more than 1.7 wt % (≤1.7 wt %), preferably no more than 1.6 wt %, more preferably no more than 1.5 wt %, further preferably no more than 1.4 wt %, most preferably no more than 1.3 wt %, such as no more than 1.2 wt %, no more than 1.1 wt %, no more than 1.0 wt %, no more than 0.9 wt %, no more than 0.8 wt %, no more than 0.7 wt %, no more than 0.6 wt %, no more than 0.5 wt %, no more than 0.4 wt %, or no more than 0.3 wt %.

Preferably, the purity of the ilaprazole sodium is no less than 99.9%.

Preferably, the ilaprazole polysulfide dimer is ilaprazole disulfide dimer and/or ilaprazole trisulfide dimer.

Preferably, the ilaprazole ylide is selected from one or more of ilaprazole carboxyl ylide, ilaprazole hydroxyl ylide and ilaprazole mercaptomethyl ylide.

Preferably, the ilaprazole derivative is ilaprazole polysulfide dimer, ilaprazole sulfone, ilaprazole thioether, ilaprazole carboxyl ylide, ilaprazole hydroxyl ylide, and ilaprazole mercaptomethyl ylide.

Preferably, the amount of the ilaprazole ylide is no more than 0.9 wt %, preferably no more than 0.8 wt %, more preferably no more than 0.7 wt %, preferably no more than 0.6 wt %, preferably no more than 0.5 wt %, preferably no more than 0.4 wt %, preferably no more than 0.3 wt %, preferably no more than 0.2 wt %.

Preferably, the amount of the ilaprazole carboxyl ylide in the composition is no more than 0.3 wt %.

Preferably, the mass ratio of the ilaprazole sulfone to the ilaprazole thioether is 1:0.5-2, preferably 1:0.5-1 or 1:1-2, more preferably 1:1.

Preferably, the amount of the ilaprazole polysulfide dimer is no more than 0.4 wt %, preferably no more than 0.3 wt %.

Preferably, the ilaprazole polysulfide dimer is ilaprazole disulfide dimer and ilaprazole trisulfide dimer.

Preferably, the weight ratio of the ilaprazole disulfide dimer to the ilaprazole trisulfide dimer is 1:0.5-2, preferably 1:0.5-1 or 1:1-2, more preferably 1:1.

Preferably, the pharmaceutical composition comprises or consists of the following parts by weight of substances:
ilaprazole sodium 98.3-99.3 parts;
ilaprazole sulfone 0.1-0.2 parts;
ilaprazole thioether 0.1-0.2 parts;
ilaprazole carboxyl ylide 0.1-0.3 parts;
ilaprazole hydroxyl ylide 0.1-0.3 parts;
ilaprazole mercaptomethyl ylide 0.1-0.3 parts;
ilaprazole disulfide dimer 0.1-0.2 parts;
ilaprazole trisulfide dimer 0.1-0.2 parts.

Preferably, the composition comprises or consists of the following parts by weight of substances:
ilaprazole sodium 98.3 parts;
ilaprazole sulfone 0.2 parts;
ilaprazole thioether 0.2 parts;
ilaprazole carboxyl ylide 0.3 parts;
ilaprazole hydroxyl ylide 0.3 parts;
ilaprazole mercaptomethyl ylide 0.3 parts;
ilaprazole disulfide dimer 0.2 parts;
ilaprazole trisulfide dimer 0.2 parts.

The present invention also provides a powder for injection comprising the pharmaceutical composition as described above (the pharmaceutical composition comprises ilaprazole sodium and an ilaprazole derivative, wherein the ilaprazole derivative is ilaprazole polysulfide dimer, and/or is selected from one or more of ilaprazole sulfone, ilaprazole thioether, and ilaprazole ylide) and a pharmaceutically acceptable carrier.

Preferably, the pharmaceutically acceptable carrier is mannitol and EDTA-2Na.

Preferably, the weight ratio of mannitol to EDTA-2Na is 10-50:1, preferably 30:1.

Preferably, the weight ratio between the weight of the ilaprazole or a salt thereof and the ilaprazole derivative (ie, the pharmaceutical composition as described above) in total, mannitol, and EDTA-2Na in the powder for injection is 1:3-5:0.1-0.3, preferably 1:3:0.1.

Preferably, the pH of the powder for injection is 10.5-11.5, preferably 11.

In addition, the present invention also provides a method for preparing the powder for injection as described above, comprising the following steps:
(1) weighing the ilaprazole sodium, the ilaprazole derivative, and the pharmaceutically acceptable carrier according to their prescribed amounts;
(2) dissolving the pharmaceutically acceptable carrier in water for injection, and adjusting the pH of the solution obtained to 10.5-11.5, preferably 10.5 with 2 mol/L sodium hydroxide solution, then adding the prescribed amounts of the ilaprazole sodium and the ilaprazole derivative to the solution, and after the ilaprazole sodium and the ilaprazole derivative fully dissolve, adjusting the pH of the solution obtained to 10.5-11.5, preferably 11 with 2 mol/L sodium hydroxide solution, and finally adding water for injection of 4° C. to the solution up to 15000 mg;

(3) sterilizing the solution obtained in step (2) through filtering two times with a filter membrane having a pore size of 0.2 μm and freeze-drying the filtrate obtained to obtain freeze-dried powders for injection, which are then sealed with a stopper in a vacuum pump, removed from the vacuum pump and capped with an aluminum cap.

The present invention also provides a method for treating digestive tract disease, comprising administering a therapeutically effective amount of the pharmaceutical composition as described above to a patient in need, wherein, preferably, the digestive tract disease is selected from the group consisting of duodenal ulcer, gastric ulcer and reflux esophagitis.

Chemical names and preparation progresses of the ilaprazole derivatives described in the present invention are as follows:

Ilaprazole Thioether: 2-[[(4-methoxy-3-methyl)-2-pyridyl]-methylthio]-5-(1H-pyrrol-1-yl)-1H-benzimidazole Preparation Progress:

10.0 g (46.4 mmol) of 5-(1H-pyrrol-1-yl)-2-mercaptobenzimidazole and 3.71 g (92.8 mmol) of NaOH were dissolved in 100 mL of methanol, and heated to 50° C. to dissolve, thereby obtaining a reaction solution. 9.65 g (46.4 mmol) of 4-methoxy-2-chloromethyl-3-methylpyridine hydrochloride was dissolved in 100 mL of methanol, and then added to the reaction solution. After refluxing for 1.5 h, a large amount of yellow solid was precipitated, and the reaction was monitored by TLC until the reaction was complete. 200 mL of water was added to the reaction solution, and the mixture obtained was stirred for 30 min, suction filtered, and the filter cake was washed with water and dried. 16.1 g of 2-[[(4-methoxy-3-methyl)-2-pyridyl]-methylthio]-5-(1H-pyrrole-1-yl)-1H-benzimidazole was obtained, and the resulting solid was refined with dichloromethane/ethyl acetate to obtain 13.2 g of off-white solid, with a yield of 81.2%.

Ilaprazole Sulfone: 5-(1H-pyrrol-1-yl)-2-[[(4-methoxy-3-methyl)-2-pyridyl]-methyl]-sulfonyl-1H-benzimidazole Preparation Progress:

ilaprazole thioether (7.0 g, 20.0 mmol) was dissolved in 70 ml of chloroform, to which 50 ml of m-CPBA (13.8 g. 80.0 mol) in chloroform was added at room temperature, and the reaction was monitored by TLC for in-process control until no raw materials remained. The reaction was quenched with 70 ml of saturated sodium carbonate solution, and the organic layer was collected and washed with 70 ml of water, then from which water was removed with 7.0 g of magnesium sulfate. Then the remainder was concentrated to dryness, and purified with a silica gel column to obtain 3.48 g of ilaprazole sulfone, with a yield of 45.5%.

Ilaprazole Carboxyl Ylide: 1-[5-(1H-pyrrol-1-yl)-1H-benzo[d]imidazol-2-yl]-4-methoxy-3methylpyridin-2-carboxylic acid-1-ylide Preparation Progress:

Preparation of a destruction sample: 5 g of ilaprazole was placed in 200 ml of a destruction solution [0.02 mol/L potassium dihydrogen phosphate-methanol (55:45), with pH adjusted to 10.0 with 1 mol/L sodium hydroxide solution], and stirred to dissolve under a heating condition of 50-60° C. Then the reaction was stirred for 20 h with heat preservation, and solvent was removed by distillation under reduced pressure at 30-50° C. to obtain a viscous substance, which was dried in vacuum to obtain the target destruction sample.

Purification and separation: the target sample was dissolved in DMSO, and its concentration was controlled to about 100 mg/ml. Target component was collected by semi-preparative high performance liquid chromatograph, with 0.3 ml per injection and 5 mM ammonium bicarbonate/methanol (20:60) as mobile phase. Solvent was removed from the collected component by rotary evaporation and the remainder was freeze-dried to obtain 75 mg of the target solid.

Ilaprazole Hydroxyl Ylide: 1-[5-(1H-pyrrol-1-yl)-1H-benzo[d]imidazol-2-yl]-4-hydroxy-2,3-dimethylpyridin-1-ylide Preparation Progress:

Preparation of destruction sample: 5 g of ilaprazole was placed in 200 ml of a destruction solution [0.02 mol/L potassium dihydrogen phosphate-methanol (55:45), with pH adjusted to 10.0 with 1 mol/L sodium hydroxide solution], and stirred to dissolve under a heating condition of 50-60° C. Then the reaction was stirred for 20 h with heat preservation, and solvent was removed by distillation under reduced pressure at 30-50° C. to obtain a viscous substance, which was dried in vacuum to obtain the target destruction sample.

Purification and separation: the target sample was dissolved in DMSO, and its concentration was controlled to about 100 mg/ml. Target component was collected by semi-preparative high performance liquid chromatograph, with 0.3 ml per injection and 5 mM ammonium bicarbonate/methanol (20:60) as mobile phase. Solvent was removed from the collected component by rotary evaporation and the remainder was freeze-dried to obtain 25 mg of the target solid.

Ilaprazole Mercaptomethyl Ylide: 1-[5-(1H-pyrrol-1-yl)-1H-benzo[d]imidazol-2-yl]-2-mercaptomethyl-4-methoxy-3-methylpyridin-1-ylide Preparation Progress:

Preparation of destruction sample: 5 g of ilaprazole was placed in 200 ml of a destruction solution [0.02 mol/L potassium dihydrogen phosphate-methanol (55:45), with pH adjusted to 10.0 with 1 mol/L sodium hydroxide solution], and stirred to dissolve under a heating condition of 50-60° C. Then the reaction was stirred for 20 h with heat preservation, and solvent was removed by distillation under reduced pressure at 30-50° C. to obtain a viscous substance, which was dried in vacuum to obtain the target destruction sample.

Purification and separation: the target sample was dissolved in DMSO, and its concentration was controlled to about 100 mg/ml. Target component was collected by semi-preparative high performance liquid chromatograph, with 0.3 ml per injection and 5 mM ammonium bicarbonate/methanol (20:60) as mobile phase. Solvent was removed from the collected component by rotary evaporation and the remainder was freeze-dried to obtain 75 mg of the target solid.

Ilaprazole Disulfide Dimer: 2-(2-((((1-(5-(1H-pyrrol-1-yl)-1H-benzene[d]imidazol-2-yl)-4-methoxy-3-methylpyridin-1-ylide-2-yl)-methyl)-dithio)-methyl)-4-methoxy-3-methylpyridin-1-ylide)-5-(1H-pyrrol-1-yl)-1H-benzo[d]imidazole Preparation Progress:

Preparation of destruction sample: 5 g of ilaprazole was placed in 200 ml of a destruction solution [0.02 mol/L potassium dihydrogen phosphate-methanol (55:45), with pH adjusted to 10.0 with 1 mol/L sodium hydroxide solution], and stirred to dissolve under a heating condition of 50-60° C. Then the reaction was stirred for 20 h with heat preservation, and solvent was removed by distillation under reduced pressure at 30-50° C. to obtain a viscous substance, which was dried in vacuum to obtain the target destruction sample.

Purification and separation: the target sample was dissolved in DMSO, and its concentration was controlled to about 100 mg/ml. Target component was collected by semi-preparative high performance liquid chromatograph, with 0.3 ml per injection and 5 mM ammonium bicarbonate/methanol (20:60) as mobile phase. Solvent was removed from the collected component by rotary evaporation and the remainder was freeze-dried to obtain 25 mg of the target solid.

Ilaprazole Trisulfide Dimer: 2-(2-((((1-(5-(1H-pyrrol-1-yl)-1H-benzene[d]imidazol-2-yl)-4-methoxy-3-methylpyridin-1-ylide-2-yl)-methyl)-trithio)-methyl)-4-methoxy-3-methylpyridin-1-ylide)-5-(1H-pyrrol-1-yl)-1H-benzo[d]imidazole Preparation Progress:

Preparation of destruction sample: 5 g of ilaprazole was placed in 200 ml of a destruction solution [0.02 mol/L potassium dihydrogen phosphate-methanol (55:45), with pH adjusted to 10.0 with 1 mol/L sodium hydroxide solution], and stirred to dissolve under a heating condition of 50-60° C. Then the reaction was stirred for 20 h with heat preservation, and solvent was removed by distillation under reduced pressure at 30-50° C. to obtain a viscous substance, which was dried in vacuum to obtain the target destruction sample.

Purification and separation: the target sample was dissolved in DMSO, and its concentration was controlled to about 100 mg/ml. Target component was collected by semi-preparative high performance liquid chromatograph, with 0.3 ml per injection and 5 mM ammonium bicarbonate/methanol (20:60) as mobile phase. Solvent was removed from the collected component by rotary evaporation and the remainder was freeze-dried to obtain 25 mg of the target solid.

The composition of ilaprazole powder for injection provided by the present invention has more stable quality, can more effectively control the symptoms of gastric mucosal bleeding, and has more clinical application significance.

DETAILED DESCRIPTION OF PREFERRED EMBODIMENTS

The present invention will be further described below in conjunction with specific examples. It should be understood that the examples of the present invention are only used to illustrate the present invention, and are not intended to limit the scope of the present invention.

Experimental methods without specific conditions in the following examples are usually carried out under conventional conditions or according to conditions recommended by manufacturers. Unless otherwise defined, all professional and scientific terms used in the context have the same meaning as those familiar to those skilled in the art.

In addition, any method and material similar or equivalent to the content described can be applied to the method of the present invention. The preferred implementation methods and materials described herein are for demonstration purposes only.

Sources of Materials:

ilaprazole sodium: Livzon (Group) Pharmaceutical Factory ilaprazole sulfone: prepared by the progress as described in the specification of the present application ilaprazole thioether: prepared by the progress as described in the specification of the present application ilaprazole carboxyl ylide: prepared by the progress as described in the specification of the present application ilaprazole hydroxyl ylide: prepared by the progress as described in the specification of the present application ilaprazole mercaptomethyl ylide: prepared by the progress as described in the specification of the present application ilaprazole disulfide dimer: prepared by the progress as described in the specification of the present application ilaprazole trisulfide dimer: prepared by the progress as described in the specification of the present application The purity of the above drugs is 99.9%.

Example 1: Preparation of Ilaprazole Sodium Powder for Injection (1) materials were weighed according to prescribed amounts: ilaprazole sodium 98.7 mg, ilaprazole sulfone 0.2 mg, ilaprazole thioether 0.2 mg, ilaprazole carboxyl ylide 0.3 mg, ilaprazole hydroxyl ylide 0.3 mg, ilaprazole mercaptomethyl ylide 0.3 mg, mannitol 300 mg. EDTA-2Na 10 mg;

(2) mannitol and disodium edetate were dissolved in water for injection, and the pH of the solution obtained was adjusted to 10.5 with 2 mol/L sodium hydroxide solution; the ilaprazole sodium (purity: 99.9%), ilaprazole sulfone, ilaprazole thioether, ilaprazole carboxyl ylide, ilaprazole hydroxyl ylide, and ilaprazole mercaptomethyl ylide weighed in step (1) were added to the solution, and after they had fully dissolved, the pH of the solution obtained was adjusted to 11 with 2 mol/L sodium hydroxide solution, and finally water for injection of 4° C. was added to the solution up to 15000 mg;

(3) the solution obtained in step (2) was sterilized through filtering two times with a filter membrane having a pore size of 0.2 μm and the filtrate obtained was freeze-dried to obtain freeze-dried powders for injection, which are then sealed with a stopper in a vacuum pump, removed from the vacuum pump and capped with an aluminumcap.

Examples 2-8

Formulations of Examples 2-8 are shown in Table 1, and preparation methods are the same as that described in Example 1.

TABLE 1

Formulations of Examples 1-8

| Component (mg) | ilaprazole sodium | ilaprazole sulfone | ilaprazole thioether | ilaprazole carboxyl ylide | ilaprazole hydroxyl ylide | ilaprazole mercaptomethyl ylide | Mannitol | EDTA-2Na |
|---|---|---|---|---|---|---|---|---|
| Example 1 | 98.7 | 0.2 | 0.2 | 0.3 | 0.3 | 0.3 | 300 | 10 |
| Example 2 | 98.7 | 0.2 | 0.2 | 0.3 | 0.3 | 0.3 | 500 | 10 |
| Example 3 | 98.7 | 0.2 | 0.2 | 0.3 | 0.3 | 0.3 | 300 | 30 |
| Example 4 | 98.7 | 0.2 | 0.2 | 0.3 | 0.3 | 0.3 | 500 | 30 |
| Example 5 | 98.7 | 0.2 | 0.1 | 0.4 | 0.3 | 0.3 | 300 | 10 |
| Example 6 | 98.4 | 0.3 | 0.3 | 0.2 | 0.4 | 0.4 | 300 | 10 |
| Example 7 | 98.7 | 0.2 | 0.1 | 0.3 | 0.4 | 0.3 | 300 | 10 |
| Example 8 | 98.7 | 0.2 | 0.1 | 0.3 | 0.3 | 0.4 | 300 | 10 |

Experimental Example 9

1. Clarity Test 30 mg of ilaprazole sodium powder for injection prepared in Example 1 and ilaprazole sodium powders for injection prepared in the following three groups A, B, and C were taken, to which water for injection was added up to 1 g to obtain solutions. The solutions were placed at 4° C., 16° C., 25° C., 40° C., respectively with bottles containing the solutions opened. Changes in color and clarity of the solutions were observed. As a blank group for detection, 30 mg of mannitol and 1 mg of EDTA-2Na were dissolved in a suitable amount of water for injection, to which water for injection was added up to 1 g, and tested simultaneously. Results are shown in Table 2.

ilaprazole composition of Group A: ilaprazole sodium powder for injection (abbreviated as A) was obtained according to the preparation method as described in Example 2 in CN102038648A;

ilaprazole composition of Group B: ilaprazole sodium powder for injection (abbreviated as B) was obtained according to the preparation method as described in Example 1 in CN105769778A;

ilaprazole composition of Group C: ilaprazole sodium powder for injection (abbreviated as C) was obtained according to the preparation method as described in Example 2 in CN105055342A

TABLE 2

| Group | 4° C. | 16° C. | 25° C. | 40° C. |
|---|---|---|---|---|
| Blank group | Having a turbidity lower than that of No. 1 turbidity standard solution at 24 hours | Having a turbidity lower than that of No. 1 turbidity standard solution at 24 hours | Having a turbidity lower than that of No. 1 turbidity standard solution at 24 hours | Having a turbidity lower than that of No. 1 turbidity standard solution at 24 hours |
| Example 1 | Having a turbidity equivalent to that of No. 1 turbidity standard solution at 14 hours, and equivalent to that of No. 2 turbidity standard solution after 20 hours | Having a turbidity equivalent to that of No. 1 turbidity standard solution at 12 hours, and equivalent to that of No. 2 turbidity standard solution after 18 hours | Having a turbidity equivalent to that of No. 1 turbidity standard solution at 11 hours, and equivalent to that of No. 2 turbidity standard solution after 17 hours | Having a turbidity equivalent to that of No. 1 turbidity standard solution at 6 hours, and equivalent to that of No. 2 turbidity standard solution after 11 hours |
| A | Having a turbidity equivalent to that of No. 1 turbidity standard solution at 3.5 hours, and equivalent to that of No. 2 turbidity standard solution after 5 hours | Having a turbidity equivalent to that of No. 1 turbidity standard solution at 4 hours, and equivalent to that of No. 2 turbidity standard solution after 7 hours | Having a turbidity equivalent to that of No. 1 turbidity standard solution at 4 hours, and equivalent to that of No. 2 turbidity standard solution after 6 hours | Having a turbidity equivalent to that of No. 1 turbidity standard solution at 1 hour, and equivalent to that of No. 2 turbidity standard solution after 3 hours |
| B | Having a turbidity equivalent to that of No. 1 turbidity standard solution at 5.5 hours, and equivalent to that of No. 2 turbidity standard solution after 8 hours | Having a turbidity equivalent to that of No. 1 turbidity standard solution at 8 hours, and equivalent to that of No. 2 turbidity standard solution after 12 hours | Having a turbidity equivalent to that of No. 1 turbidity standard solution at 8 hours, and equivalent to that of No. 2 turbidity standard solution after 10 hours | Having a turbidity equivalent to that of No. 1 turbidity standard solution at 3 hours, and equivalent to that of No. 2 turbidity standard solution after 6 hours |
| C | Having a turbidity equivalent to that of No. 1 turbidity standard solution at 3 hours, and equivalent to that of No. 2 turbidity standard solution after 7 hours | Having a turbidity equivalent to that of No. 1 turbidity standard solution at 2 hours, and equivalent to that of No. 2 turbidity standard solution after 4 hours | Having a turbidity equivalent to that of No. 1 turbidity standard solution at 1.5 hours, and equivalent to that of No. 2 turbidity standard solution after 3 hours | Having a turbidity equivalent to that of No. 1 turbidity standard solution at 0.5 hours, and equivalent to that of No. 2 turbidity standard solution after 2 hours |

From the above results, it can be seen that the powder for injection prepared in Example 1 has better clarity under the conditions of 4° C., 16° C., 25° C. and 40° C. than the powders for injection of Group A, Group B and Group C.

2. Stability Test

Powders for injection prepared in Examples 1-8 were placed at a temperature of 60° C. and a relative humidity of 95% for 30 days, and samples were taken. Specific test results are shown in Table 3 below.

TABLE 3

| Condition | Ilaprazole sodium content (%) 0 day | Reduction of ilaprazole sodium content compared to 0 day (%) 10 days | 30 days |
|---|---|---|---|
| Example 1 | 98.7 | 0.28 | 0.63 |
| Example 2 | 98.7 | 0.37 | 0.79 |
| Example 3 | 98.7 | 0.35 | 0.81 |
| Example 4 | 98.7 | 0.39 | 0.78 |
| Example 5 | 98.7 | 1.35 | 1.93 |
| Example 6 | 98.4 | 0.53 | 0.98 |
| Example 7 | 98.7 | 0.47 | 0.91 |
| Example 8 | 98.7 | 0.45 | 0.92 |

As shown in the table above, the content of ilaprazole sodium in the powders for injection prepared in Examples 1~4 and 6-8 decreased at a slower rate under the conditions of high temperature and high humidity, i.e. a temperature of 60° C. and a relative humidity of 95%. The content of ilaprazole sodium in the powder for injection prepared in Example 1 decreased at the slowest rate, having the best effect. The content of ilaprazole sodium in the powder for injection prepared in Example 5 decreased fast.

3. Pharmacodynamic Test (1) Test Model:

Rat model of acute gastric ulcer bleeding was selected (to simulate the hemostatic effect of the ilaprazole sodium composition for injection under the condition of direct gastric ulcer bleeding).

(2) Dosage Selection:

It can be known by conversion from clinically effective doses of ilaprazole sodium for injection and non-clinical research data that, the dosage of ilaprazole sodium for injection effective for a rat model of gastric ulcer induced in laboratory should be in the range of 1-10 mg/kg.

(3) Administration Dosage:

Administration dosage range was 0.5-10 mg/kg (0.5, 1, 2, 5, 10 mg/kg) in the rodent study, and blank control group was injected intravenously with 1 ml/kg vehicle.

(4) Establishment of the Rat Model of Acute Gastric Ulcer Bleeding

SD rats weighing 180-250 g were randomly divided into 5 groups, with 5 rats in each group. After intraperitoneally anesthetized with 25 g/L pentobarbital sodium (1 ml/kg), they were fixed on plates, and injected with drugs to be tested or vehicle via femoral vein.

At a certain time after administration (a reference value is 30 min, adjusted according to pre-experiments), the abdomen of each of the rats was exposed and cut along midline, then the stomach was opened, and one piece of each of gastric antrum and gastric mucosa was taken simultaneously using small biopsy forceps to form an acute bleeding lesion, thereby building an ulcer bleeding model. Gastric mucosal bleeding time (GMBT) of each rat was recorded, and the average, median, and standard deviation were calculated and statistically tested.

(5) Test Grouping:

Each test was set up with blank control group, group of Example 1, group A, group B, and group C, and the preparation methods of drugs administrated in group A, group B, and group C were the same as those in the clarity test. Test results are shown in Table 4.

TABLE 4

| Group/ GMBT (second) | Dosage (mg/kg) | | | | |
|---|---|---|---|---|---|
| | 0.5 | 1 | 2 | 5 | 10 |
| Example 1 | 73.0 ± 3.0 | 68.0 ± 2.0 | 62.0 ± 3.0 | 58.0 ± 2.0 | 53.0 ± 2.0 |
| A | 94.0 ± 2.0 | 88.0 ± 2.0 | 82.0 ± 2.0 | 74.0 ± 2.0 | 72.0 ± 2.0 |
| B | 105.0 ± 2.0 | 98.0 ± 2.0 | 86.0 ± 2.0 | 80.0 ± 2.0 | 78.0 ± 2.0 |
| C | 96.0 ± 2.0 | 89.0 ± 3.0 | 82.0 ± 3.0 | 75.0 ± 2.0 | 72.0 ± 3.0 |
| Blank control group | | | 158 ± 2.0 | | |

As shown in the table above, the powder for injection prepared in Example 1 can stop bleeding more effectively against acute gastric ulcer bleeding in rats, having a better effect.

Example 10: Preparation of Ilaprazole Sodium Powder for Injection (1) materials were weighed according to prescribed amounts: ilaprazole sodium (purity: 99.9%) 98.7 mg, ilaprazole sulfone 0.2 mg, ilaprazole thioether 0.2 mg, ilaprazole carboxyl ylide 0.3 mg, ilaprazole hydroxyl ylide 0.3 mg, ilaprazole mercaptomethyl ylide 0.3 mg, ilaprazole disulfide dimer 0.2 mg, ilaprazole trisulfide dimer 0.2 mg, mannitol 300 mg, EDTA-2Na 10 mg.

(2) mannitol and disodium edetate were dissolved in water for injection, and the pH of the solution obtained was adjusted to 10.5 with 2 mol/L sodium hydroxide solution; the ilaprazole sodium (purity: 99.9%), ilaprazole sulfone, ilaprazole thioether, ilaprazole carboxyl ylide, ilaprazole hydroxyl ylide, ilaprazole mercaptomethyl ylide, ilaprazole disulfide dimer, and ilaprazole trisulfide dimer weighed in step (1) were added to the solution, and after they had fully dissolved, the pH of the solution obtained was adjusted to 11 with 2 mol/L sodium hydroxide solution, and finally water for injection of 4° C. was added to the solution up to 15000 mg;

(3) the solution obtained in step (2) was sterilized through filtering two times with a filter membrane having a pore size of 0.2 μm and the filtrate obtained was freeze-dried to obtain freeze-dried powders for injection, which are then sealed with a stopper in a vacuum pump, removed from the vacuum pump and capped with an aluminum cap.

Examples 11-19: Preparation of Ilaprazole Sodium Powder for Injection

Formulations of Examples 11-19 are shown in Table 5, and preparation methods are the same as that described in Example 10.

TABLE 5

Formulations of Examples 10-19

| Component (mg) | Ilaprazole sodium | Ilaprazole sulfone | Ilaprazole thioether | Ilaprazole carboxyl ylide | Ilaprazole hydroxyl ylide | Ilaprazole mercaptom ethyl ylide | Ilaprazole disulfide dimer | Ilaprazole trisulfide dimer | Mannitol | EDTA-2Na |
|---|---|---|---|---|---|---|---|---|---|---|
| Example 10 | 98.3 | 0.2 | 0.2 | 0.3 | 0.3 | 0.3 | 0.2 | 0.2 | 300 | 10 |
| Example 11 | 98.3 | 0.2 | 0.2 | 0.3 | 0.3 | 0.3 | 0.2 | 0.2 | 500 | 10 |
| Example 12 | 98.3 | 0.2 | 0.2 | 0.3 | 0.3 | 0.3 | 0.2 | 0.2 | 300 | 30 |
| Example 13 | 98.3 | 0.2 | 0.2 | 0.3 | 0.3 | 0.3 | 0.2 | 0.2 | 500 | 30 |
| Example 14 | 98.3 | 0.2 | 0.2 | 0.3 | 0.2 | 0.2 | 0.3 | 0.3 | 300 | 10 |
| Example 15 | 98.0 | 0.4 | 0.3 | 0.3 | 0.3 | 0.4 | 0.2 | 0.1 | 300 | 10 |
| Example 16 | 98.3 | 0.2 | 0.3 | 0.3 | 0.3 | 0.4 | 0.1 | 0.1 | 300 | 10 |
| Example 17 | 98.3 | 0.2 | 0.3 | 0.3 | 0.4 | 0.35 | 0.1 | 0.05 | 300 | 10 |
| Example 18 | 98.3 | 0.2 | 0.2 | 0.4 | 0.2 | 0.3 | 0.2 | 0.2 | 300 | 10 |
| Example 19 | 98.2 | 0.3 | 0.3 | 0.2 | 0.3 | 0.3 | 0.2 | 0.2 | 300 | 10 |

Experimental Example 20

1. Clarity Test 30 mg of ilaprazole sodium powder for injection prepared in Example 10 and ilaprazole sodium powders for injection prepared in the following three groups A, B, and C were taken, to which water for injection was added up to 1 g to obtain solutions. The solutions were placed at 4° C., 16° C., 25° C., 40° C., respectively with bottles containing the solutions opened. Changes in color and clarity of the solutions were observed. As a blank group for detection, 30 mg of mannitol and 1 mg of EDTA-2Na were dissolved in a suitable amount of water for injection, to which water for injection was added up to 1 g, and tested simultaneously. Results are shown in Table 6.

Ilaprazole composition of Group A: ilaprazole sodium powder for injection (abbreviated as A) was obtained according to the preparation method as described in Example 2 in CN102038648A;

Ilaprazole composition of Group B: ilaprazole sodium powder for injection (abbreviated as B) was obtained according to the preparation method as described in Example 1 in CN105769778A;

Ilaprazole composition of Group C: ilaprazole sodium powder for injection (abbreviated as C) was obtained according to the preparation method as described in Example 1 in CN105055342A

TABLE 6

| Group | 4° C. | 16° C. | 25° C. | 40° C. |
|---|---|---|---|---|
| Blank group | Having a turbidity lower than that of No. 1 turbidity standard solution at 24 hours | Having a turbidity lower than that of No. 1 turbidity standard solution at 24 hours | Having a turbidity lower than that of No. 1 turbidity standard solution at 24 hours | Having a turbidity lower than that of No. 1 turbidity standard solution at 24 hours |
| Example 10 | Having a turbidity equivalent to that of No. 1 turbidity standard solution at 13 hours, and equivalent to that of No. 2 turbidity standard liquid after 19 hours | Having a turbidity equivalent to that of No. 1 turbidity standard solution at 10 hours, and equivalent to that of No. 2 turbidity standard liquid after 17 hours | Having a turbidity equivalent to that of No. 1 turbidity standard solution at 10 hours, and equivalent to that of No. 2 turbidity standard liquid after 15 hours | Having a turbidity equivalent to that of No. 1 turbidity standard solution at 6 hours, and equivalent to that of No. 2 turbidity standard liquid after 10 hours |
| A | Having a turbidity equivalent to that of No. 1 turbidity standard solution at 3.5 hours, and equivalent to that of No. 2 turbidity standard solution after 5 hours | Having a turbidity equivalent to that of No. 1 turbidity standard solution at 4 hours, and equivalent to that of No. 2 turbidity standard solution after 7 hours | Having a turbidity equivalent to that of No. 1 turbidity standard solution at 4 hours, and equivalent to that of No. 2 turbidity standard solution after 6 hours | Having a turbidity equivalent to that of No. 1 turbidity standard solution at 1 hour, and equivalent to that of No. 2 turbidity standard solution after 3 hours |
| B | Having a turbidity equivalent to that of No. 1 turbidity standard solution at 5.5 hours, and equivalent to that of No. 2 turbidity standard solution after 8 hours | Having a turbidity equivalent to that of No. 1 turbidity standard solution at 8 hours, and equivalent to that of No. 2 turbidity standard solution after 12 hours | Having a turbidity equivalent to that of No. 1 turbidity standard solution at 8 hours, and equivalent to that of No. 2 turbidity standard solution after 10 hours | Having a turbidity equivalent to that of No. 1 turbidity standard solution at 3 hours, and equivalent to that of No. 2 turbidity standard solution after 6 hours |

TABLE 6-continued

| Group | 4° C. | 16° C. | 25° C. | 40° C. |
|---|---|---|---|---|
| C | Having a turbidity equivalent to that of No. 1 turbidity standard solution at 3 hours, and equivalent to that of No. 2 turbidity standard solution after 7 hours | Having a turbidity equivalent to that of No. 1 turbidity standard solution at 2 hours, and equivalent to that of No. 2 turbidity standard solution after 4 hours | Having a turbidity equivalent to that of No. 1 turbidity standard solution at 1.5 hours, and equivalent to that of No. 2 turbidity standard solution after 3 hours | Having a turbidity equivalent to that of No. 1 turbidity standard solution at 0.5 hours, and equivalent to that of No. 2 turbidity standard solution after 2 hours |

From the above results, it can be seen that the powder for injection prepared in Example 10 has better clarity under the conditions of 4° C., 16° C., 25° C. and 40° C. than the powders for injection of Group A, Group B and Group C.

2. Stability Test

Powders for injection prepared in Examples 10-19 were placed at a temperature of 60° C. and a relative humidity of 95% for 30 days, and samples were taken. Specific test results are shown in Table 7 below.

TABLE 7

| Condition | Ilaprazole sodium content (%) | Reduction of ilaprazole sodium content compared to 0 day (%) | |
|---|---|---|---|
| | 0 day | 10 days | 30 days |
| Example 10 | 98.3 | 0.29 | 0.59 |
| Example 11 | 98.3 | 0.39 | 0.73 |
| Example 12 | 98.3 | 0.41 | 0.79 |
| Example 13 | 98.3 | 0.38 | 0.75 |
| Example 14 | 98.3 | 1.13 | 1.71 |
| Example 15 | 98.0 | 0.81 | 1.03 |
| Example 16 | 98.3 | 0.69 | 0.98 |
| Example 17 | 98.3 | 0.73 | 0.97 |
| Example 18 | 98.3 | 1.21 | 1.95 |
| Example 19 | 98.2 | 0.61 | 0.93 |

As shown in the table above, the content of ilaprazole sodium in the powders for injection prepared in Examples 10-13, 15-17 and 19 decreased at a slower rate under the conditions of high temperature and high humidity, i.e. a temperature of 60° C. and a relative humidity of 95%. The content of ilaprazole sodium in the powder for injection prepared in Example 10 decreased at the slowest rate, having the best effect. The content of ilaprazole sodium in the powders for injection prepared in Examples 14 and 18 decreased fast.

3. Pharmacodynamic Test (1) Test Model:

Rat model of acute gastric ulcer bleeding was selected (to simulate the hemostatic effect of the ilaprazole sodium composition for injection under the condition of direct gastric ulcer bleeding).

(2) Dosage Selection:

It can be known by conversion from clinically effective doses of ilaprazole sodium for injection and non-clinical research data that, the dosage of ilaprazole sodium for injection effective for a rat model of gastric ulcer induced in laboratory should be in the range of 1-10 mg/kg.

(3) Administration Dosage:

Administration dosage range was 0.5-10 mg/kg (0.5, 1, 2, 5, 10 mg/kg) in the rodent study, and blank control group was injected intravenously with 1 ml/kg vehicle.

(4) Establishment of the Rat Model of Acute Gastric Ulcer Bleeding

SD rats weighing 180-250 g were randomly divided into 5 groups, with 5 rats in each group. After intraperitoneally anesthetized with 25 g/L pentobarbital sodium (1 ml/kg), they were fixed on plates, and injected with drugs to be tested or vehicle via femoral vein.

At a certain time after administration (a reference value is 30 min, adjusted according to pre-experiments), the abdomen of each of the rats was exposed and cut along midline, then the stomach was opened, and one piece of each of gastric antrum and gastric mucosa was taken simultaneously using small biopsy forceps to form an acute bleeding lesion, thereby building an ulcer bleeding model. Gastric mucosal bleeding time (GMBT) of each rat was recorded, and the average, median, and standard deviation were calculated and statistically tested.

(5) Test Grouping:

Each test was set up with blank control group, group of Example 10, group A, group B, and group C, and the preparation methods of drugs administered in group A, group B, and group C were the same as those in the clarity test. Test results are shown in Table 8.

TABLE 8

| Group/ GMBT | Dosage (mg/kg) | | | | |
|---|---|---|---|---|---|
| (second) | 0.5 | 1 | 2 | 5 | 10 |
| Example 10 | 71.0 ± 3.0 | 66.0 ± 2.0 | 60.0 ± 3.0 | 56.0 ± 2.0 | 52.0 ± 2.0 |
| A | 94.0 ± 2.0 | 88.0 ± 2.0 | 82.0 ± 2.0 | 74.0 ± 2.0 | 72.0 ± 2.0 |
| B | 105.0 ± 2.0 | 98.0 ± 2.0 | 86.0 ± 2.0 | 80.0 ± 2.0 | 78.0 ± 2.0 |
| C | 96.0 ± 2.0 | 89.0 ± 3.0 | 82.0 ± 3.0 | 75.0 ± 2.0 | 72.0 ± 3.0 |
| Blank control group | | | 158 ± 2.0 | | |

As shown in the table above, the composition prepared in Example 10 can stop bleeding more effectively against acute gastric ulcer bleeding in rats, having a better effect.

It should be understood that the invention described herein is not limited to specific methodologies, experimental protocols, or reagents, as these may vary. The discussion and examples provided herein are presented to describe specific embodiments and are not intended to limit the scope of the invention, which is limited only by the claims.

The invention claimed is:

1. A pharmaceutical composition, comprising or consisting of the following parts by weight of substances:
   ilaprazole sodium 98.7-99.5 parts;
   ilaprazole sulfone 0.1-0.2 parts;
   ilaprazole thioether 0.1-0.2 parts;
   ilaprazole carboxyl ylide 0.1-0.3 parts;

ilaprazole hydroxyl ylide 0.1-0.3 parts; and
ilaprazole mercaptomethyl ylide 0.1-0.3 parts.

2. A powder for injection, comprising the pharmaceutical composition according to claim 1 and a pharmaceutically acceptable carrier,
the pharmaceutically acceptable carrier is mannitol and EDTA-2Na, and
the weight ratio of mannitol to EDTA-2Na is 10-50:1.

3. The powder for injection according to claim 2, wherein the pH of the powder for injection is 10.5-11.5.

4. A method for preparing the powder for injection according to claim 2, comprising the following steps:
(1) weighing the ilaprazole or a salt thereof, the ilaprazole derivative, and the pharmaceutically acceptable carrier according to their prescribed amounts;
(2) dissolving the pharmaceutically acceptable carrier in water for injection, and adjusting the pH of the solution obtained to 10.5-11.5 with 2 mol/L sodium hydroxide solution, then adding the prescribed amounts of the ilaprazole or a salt thereof and the ilaprazole derivative to the solution, and after the ilaprazole or a salt thereof and the ilaprazole derivative fully dissolve, adjusting the pH of the solution obtained to 10.5-11.5 with 2 mol/L sodium hydroxide solution, and finally adding water for injection of 4° C. to the solution up to 15000 mg;
(3) sterilizing the solution obtained in step (2) through filtering two times with a filter membrane having a pore size of 0.2 μm and freeze-drying the filtrate obtained to obtain freeze-dried powders for injection, which are then sealed with a stopper in a vacuum pump, removed from the vacuum pump and capped with an aluminum cap.

5. The pharmaceutical composition according to claim 1, wherein the pharmaceutical composition comprises or consists of the following parts by weight of substances:
ilaprazole sodium 98.3-99.3 parts;
ilaprazole sulfone 0.1-0.2 parts;
ilaprazole thioether 0.1-0.2 parts;
ilaprazole carboxyl ylide 0.1-0.3 parts;
ilaprazole hydroxyl ylide 0.1-0.3 parts;
ilaprazole mercaptomethyl ylide 0.1-0.3 parts;
ilaprazole disulfide dimer 0.1-0.2 parts; and
ilaprazole trisulfide dimer 0.1-0.2 part.

6. A powder for injection, comprising the pharmaceutical composition according to claim 5 and a pharmaceutically acceptable carrier;
the pharmaceutically acceptable carrier is mannitol and EDTA-2Na; and
the weight ratio of mannitol to EDTA-2Na is 10-50:1.

7. The powder for injection according to claim 6, wherein the pH of the powder for injection is 10.5-11.5.

8. A method for preparing the powder for injection according to claim 6, comprising the following steps:
(1) weighing the ilaprazole or a salt thereof, the ilaprazole derivative, and the pharmaceutically acceptable carrier according to their prescribed amounts;
(2) dissolving the pharmaceutically acceptable carrier in water for injection, and adjusting the pH of the solution obtained to 10.5-11.5 with 2 mol/L sodium hydroxide solution, then adding the prescribed amounts of the ilaprazole or a salt thereof and the ilaprazole derivative to the solution, and after the ilaprazole or a salt thereof and the ilaprazole derivative fully dissolve, adjusting the pH of the solution obtained to 10.5-11.5 with 2 mol/L sodium hydroxide solution, and finally adding water for injection of 4° C. to the solution up to 15000 mg;
(3) sterilizing the solution obtained in step (2) through filtering two times with a filter membrane having a pore size of 0.2 μm and freeze-drying the filtrate obtained to obtain freeze-dried powders for injection which are then sealed with a stopper in a vacuum pump, removed from the vacuum pump and capped with an aluminum cap.

9. A method for treating digestive tract disease, comprising administering a therapeutically effective amount of the pharmaceutical composition according to claim 1 to a patient in need, wherein, preferably, the digestive tract disease is selected from the group consisting of duodenal ulcers, gastric ulcers and reflux esophagitis.

10. The pharmaceutical composition according to claim 1, wherein the composition comprises or consists of the following parts by weight of substances:
ilaprazole sodium 98.7 parts;
ilaprazole sulfone 0.2 parts;
ilaprazole thioether 0.2 parts;
ilaprazole carboxyl ylide 0.3 parts;
ilaprazole hydroxyl ylide 0.3 parts; and
ilaprazole mercaptomethyl ylide 0.3 parts.

11. The powder for injection according to claim 2, wherein the weight ratio of mannitol to EDTA-2Na is 30:1.

12. The powder for injection according to claim 2, wherein the weight ratio between the weight of the ilaprazole sodium, the sum of the ilaprazole sulfone, the ilaprazole thioether, the ilaprazole carboxyl ylide, the ilaprazole hydroxyl ylide and the ilaprazole mercaptomethyl ylide, mannitol, and EDTA-2Na in the powder for injection is 1:3-5:0.1-0.3.

13. The powder for injection according to claim 2, wherein the weight ratio between the weight of the ilaprazole sodium, the sum of the ilaprazole sulfone, the ilaprazole thioether, the ilaprazole carboxyl ylide, the ilaprazole hydroxyl ylide and the ilaprazole mercaptomethyl ylide, mannitol, and EDTA-2Na in the powder for injection is 1:3:0.1.

14. The powder for injection according to claim 2, wherein the pH of the powder for injection is 11.

15. The pharmaceutical composition according to claim 5, wherein the composition comprises or consists of the following parts by weight of substances:
ilaprazole sodium 98.3 parts;
ilaprazole sulfone 0.2 parts;
ilaprazole thioether 0.2 parts;
ilaprazole carboxyl ylide 0.3 parts;
ilaprazole hydroxyl ylide 0.3 parts;
ilaprazole mercaptomethyl ylide 0.3 parts;
ilaprazole disulfide dimer 0.2 parts; and
ilaprazole trisulfide dimer 0.2 parts.

16. The powder for injection according to claim 6, wherein the weight ratio of mannitol to EDTA-2Na is 30:1.

17. The powder for injection according to claim 6, wherein the weight ratio between the weight of the ilaprazole sodium, the sum of ilaprazole sulfone, ilaprazole thioether, ilaprazole carboxyl ylide, ilaprazole hydroxyl ylide, ilaprazole mercaptomethyl ylide, ilaprazole disulfide dimer and ilaprazole trisulfide dimer, mannitol, and EDTA-2Na in the powder for injection is 1:3-5:0.1-0.3.

18. The powder for injection according to claim 6, wherein the weight ratio between the weight of the ilaprazole sodium, the sum of ilaprazole sulfone, ilaprazole thioether, ilaprazole carboxyl ylide, ilaprazole hydroxyl ylide, ilaprazole mercaptomethyl ylide, ilaprazole disulfide dimer and ilaprazole trisulfide dimer, mannitol, and EDTA-2Na in the powder for injection is 1:3:0.1.

19. The powder for injection according to claim 6, wherein the pH of the powder for injection is 11.

* * * * *